United States Patent
Jain et al.

(10) Patent No.: US 10,762,054 B2
(45) Date of Patent: Sep. 1, 2020

(54) CLOUD CONTENT STATES DETERMINATION LOGIC

(71) Applicant: Microsoft Technology Licensing, LLC, Redmond, WA (US)

(72) Inventors: Raju Jain, Kirkland, WA (US); Michael John Novak, Redmond, WA (US); Tyler Kien Beam, Seattle, WA (US); Neal Robert Christiansen, Bellevue, WA (US); Robert Paul St. Pierre, Redmond, WA (US); Craig Ashley Barkhouse, Duvall, WA (US); Ping Xie, Redmond, WA (US); Srinivasan Malayala, Redmond, WA (US); Anshul Rawat, Kirkland, WA (US); Sripresanna Sripresanna, Bothell, WA (US); Mohammed Amirali Samji, Redmond, WA (US); David Ben Perry, Redmond, WA (US)

(73) Assignee: Microsoft Technology Licensing, LLC, Redmond, VA (US)

( * ) Notice: Subject to any disclaimer, the term of this patent is extended or adjusted under 35 U.S.C. 154(b) by 823 days.

(21) Appl. No.: 15/294,288

(22) Filed: Oct. 14, 2016

(65) Prior Publication Data
US 2018/0025021 A1 Jan. 25, 2018

Related U.S. Application Data

(60) Provisional application No. 62/365,859, filed on Jul. 22, 2016.

(51) Int. Cl.
*G06F 16/178* (2019.01)
*G06F 16/182* (2019.01)
*H04L 29/08* (2006.01)

(52) U.S. Cl.
CPC .......... *G06F 16/178* (2019.01); *G06F 16/183* (2019.01); *H04L 67/1095* (2013.01)

(58) Field of Classification Search
CPC ... G06F 16/178; G06F 16/183; H04L 67/1095
See application file for complete search history.

(56) References Cited

U.S. PATENT DOCUMENTS 9,189,533 B2 11/2015 Wautier et al.
9,208,167 B1 12/2015 Henderson
(Continued)

FOREIGN PATENT DOCUMENTS

CN 102231163 9/2014
WO WO-2013162837 10/2013

OTHER PUBLICATIONS

"International Search Report and Written Opinion", Application No. PCT/US2017/040634, dated Aug. 25, 2017, 10 pages.
(Continued)

*Primary Examiner* — Cam Y T Truong

(57) ABSTRACT

Determination logic for a cloud content states framework is described herein. In implementations, a framework is configured to perform operations for management of cloud content files at the computing device on behalf of cloud storage providers. Determination logic for the framework is utilized to make state determinations in dependence upon a defined set of file sync properties. The framework operates to make assessments of the file sync properties and set states for files in accordance with the assessments. In implementations, file sync properties are related to corresponding states through a mapping data structure that maps file sync property values to different states and enables look-ups of states based on property values. The framework utilizes and references the mapping data structure to match file sync properties identified for cloud content files to corresponding (Continued)

states and then set states for the cloud content files accordingly.

20 Claims, 8 Drawing Sheets

(56) References Cited

U.S. PATENT DOCUMENTS

| | | | |
|---|---|---|---|
| 2003/0055815 A1* | 3/2003 | Chender | G06Q 10/06 |
| 2006/0230349 A1 | 10/2006 | Novak et al. | |
| 2013/0226876 A1 | 8/2013 | Gati et al. | |
| 2013/0268491 A1 | 10/2013 | Chung et al. | |
| 2014/0201137 A1 | 7/2014 | Vibhor et al. | |
| 2014/0201145 A1 | 7/2014 | Dorman et al. | |
| 2014/0282585 A1 | 9/2014 | Dictos | |
| 2014/0324776 A1 | 10/2014 | Novak et al. | |
| 2014/0324945 A1 | 10/2014 | Novak et al. | |
| 2014/0379586 A1* | 12/2014 | Sawyer | H04L 67/00 |
| | | | 705/301 |
| 2014/0379648 A1* | 12/2014 | Chiu | G06F 16/113 |
| | | | 707/624 |
| 2015/0149533 A1 | 5/2015 | Li et al. | |
| 2015/0278245 A1 | 10/2015 | Sagar et al. | |
| 2017/0331893 A1* | 11/2017 | Crofton | H04L 67/1097 |

OTHER PUBLICATIONS

"Deploying to CloudHub", Retrieved on: Jul. 26, 2016—Available at: https://docs.mulesoft.com/runtime-manager/deploying-to-cloudhub, Jul. 22, 2016, 12 pages.

"Synchronized Operating State", Available at: http://cloudpatterns.org/design_patterns/synchronized_operating_state, Jan. 27, 2013, 3 pages.

Blair, "Request for an "In the queue" indicator on files and folders", Available at: https://forum.odrive.com/t/request-for-an-in-the-queue-indicator-on-files-and-folders/213/1, Feb. 15, 2016, 3 pages.

Jones, "Taking the Next Step in Sync for OneDrive", Available at: https://blogs.office.com/2015/01/07/taking-the-next-step-in-sync-for-onedrive/, Jan. 7, 2015, 3 pages.

* cited by examiner

300 
Primary States 206
Icons 302
  
| Available Offline Synced | Syncing/Pending Download | Error State |
|---|---|---|
| 306 | 308 | 310 |
Representations 304
| 312 | 314 | 316 | 318 | 320 | 322 |
|---|---|---|---|---|---|
| Available Offline and Synced | Online Only file: Available | Syncing/Pending Download | Progress on Download | Error State | Online Only file: Not Available |
*Files*
     
*Folders*
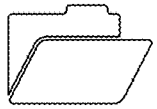 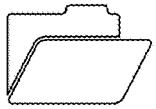 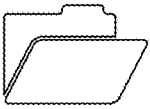 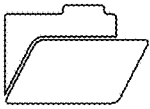  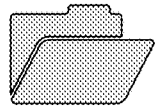
*Fig. 3*

400

402

| Visual State | State Indicator | Determination Logic |
|---|---|---|
| 404 | 406 | 408 |
| Files | | |
| Error | ⊗ | Error present in Supplemental Sync Properties OR Error present in Volatile Sync Properties |
| Warning | TBD | Warning present in Supplemental Sync Properties OR Warning present in Volatile Sync Properties |
| Placeholder Unavailable | none | File is a Partial Placeholder AND     Network is completely unavailable OR     Unavailable Root Sync Property is present |
| Uploading | ◉ | Upload Progress present in Volatile Sync Properties |
| Pending Upload | ◉ | FILE_ATTRIBUTE_IN_SYNC absent (new item or modified item) |
| Downloading | ◉ | Download Progress present in Volatile Sync Properties |
| Pending Download | ◉ | Pending Download present in Volatile Sync Properties OR File is a Partial Placeholder AND FILE_ATTRIBUTE_PINNED is set |
| Placeholder Available | none | File is a Partial Placeholder |
| Unknown | none | Pending Startup Root Sync Property is present |
| Pinned | ✓ | FILE_ATTRIBUTE_PINNED is set on the file |
| In Sync | ✓ | |
| Folders | | |
| Error | ⊗ | Any SINGLE child File or Folder matches the Error state |
| Warning | TBD | Any SINGLE child File or Folder matches the Warning state |
| Transferring | ◉ | Any SINGLE child File matches the Uploading or Downloading state |
| Pending Transfer | ◉ | Any SINGLE child File or Folder matches the Pending Download or Pending Upload state |
| Mixed Availability | None | Any SINGLE child File is a Partial Placeholder |
| Unknown | None | Pending Startup Root Sync Property is present OR Indexer not running |
| Pinned | ✓ | FILE_ATTRIBUTE_PINNED is set on the folder |
| In Sync | ✓ | |

*Fig. 4*

CLOUD CONTENT STATES DETERMINATION LOGIC

RELATED APPLICATIONS

This application claims priority under 35 U.S.C. Section 119(e) to U.S. Provisional Application No. 62/365,859, filed Jul. 22, 2016 and titled "Cloud Content States Determination Logic", the entire disclosure of which is hereby incorporated by reference.

BACKGROUND

File storage and synchronization solutions available to help users manage documents and other content, store content "in the cloud," and access cloud content from various devices over a network are becoming increasingly more common. Traditionally, applications and file systems do not make distinctions between locally maintained content (e.g., local files) and cloud content (e.g., synched files) in terms of how the files are handled and/or presented to a user. Different files may be handled substantially in the same manner by a device without regard to whether the files are kept locally or synchronized with other devices. Accordingly, adequate mechanisms do not currently exist to recognize cloud content, associate cloud content with corresponding providers, and/or enable customized handling for cloud content.

SUMMARY

Determination logic for a cloud content states framework is described herein. In one or more implementations, a framework is configured to perform operations for management of cloud content files at the computing device on behalf of cloud storage providers. The framework is operable to manage and determine states for cloud content files accessible from multiple cloud storage services. The framework also manages and outputs state indicators with file system representations of the cloud content files. The framework may be implemented as one or more components of an operating system for a client device. The states include at least a set of primary states indicative of synchronization status that is controlled by the framework for use across the multiple cloud storage services. The states may optionally include custom states associated with one or more of the cloud storage services that are defined via an interface exposed by the framework. In operation, states associated with cloud content files are determined in connection with rendering of a user interface configured to display file system representations of the cloud content files. Then, state indicators that reflect the recognized state or states are exposed along with the file system representations of the cloud content files in the user interface.

In one or more implementations, determination logic for the cloud content states framework is utilized to make state determinations in dependence upon a defined set of file sync properties. The framework operates to make assessments of the file sync properties and set states for files in accordance with the assessments. The file sync property assessments may rely upon indications regarding properties that are asserted by cloud storage providers and indications regarding properties that are ascertained by the framework/OS independently of the cloud storage providers. The file sync properties and corresponding states relate to synchronization status such as whether a file is available or not, located online or offline, actively downloading (e.g., in progress), queued for downloading, synchronized or unsynchronized with the service, or associated with an error, to name a few examples.

In one or more implementations, file sync properties are related to corresponding states through a mapping data structure that maps file sync property values to different states. The mapping data structure may be configured as a table, a database, a library file (e.g., dll), or other suitable data structure that may be employed to look-up states based on property values. The framework utilizes and references the mapping data structure to match file sync properties identified for cloud content files to corresponding states and then set states for the cloud content files accordingly. In an example approach, the mapping data structure defines an ordered list of states that is employed in a deterministic manner to assign states to files. When the ordered list is employed, determinations of state for a file occurs by evaluating file sync properties against states in the mapping data structure in the defined order until a matching state is found. The matching state is then selected and assigned to the file.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the following discussion.

FIG. 3 is diagram depicting details regarding a set of primary states in accordance with one or more implementations.

FIG. 4 is diagram depicting details regarding an example mapping data structure in accordance with one or more implementations.

DETAILED DESCRIPTION

Overview

Figure 1:
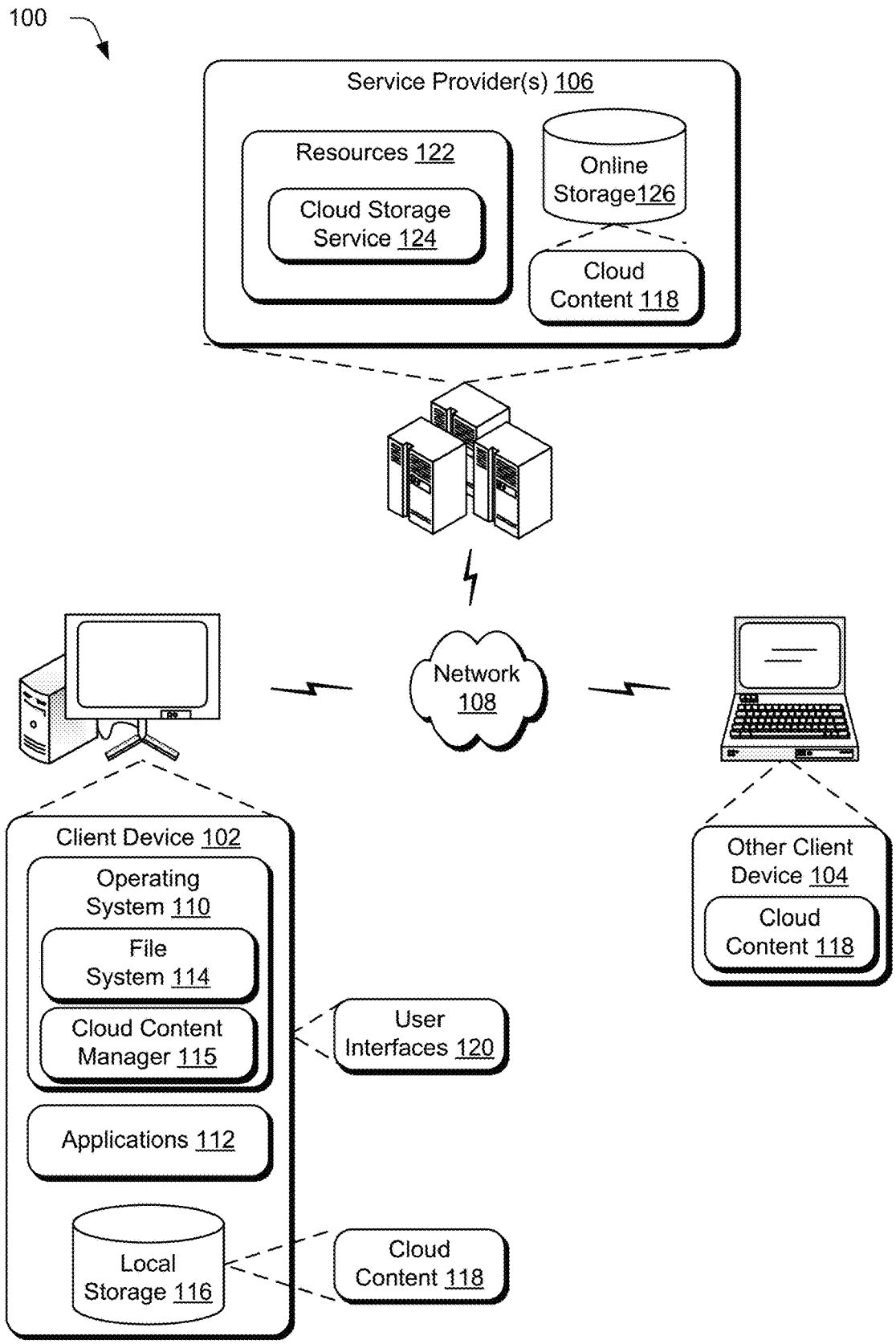
FIG. 1 is an illustration of an example operating environment that is operable to employ techniques to implement cloud content states determination logic.

Traditionally, applications and file systems do not make distinctions between locally maintained content (e.g., local files) and cloud content (e.g., synched files) in terms of how the files are handled and/or presented to a user. Accordingly, adequate mechanisms do not currently exist to recognize cloud content, associate cloud content with corresponding providers, and/or enable customized handling for cloud content.

Determination logic for a cloud content states framework is described herein. In one or more implementations, a framework is configured to perform operations for management of cloud content files at the computing device on behalf of cloud storage providers. Determination logic for the cloud content states framework is utilized to make state determinations in dependence upon a defined set of file sync properties. The framework operates to make assessments of the file sync properties and set states for files in accordance with the assessments. The file sync property assessments may rely upon indications regarding properties that are asserted by cloud storage providers and indications regarding properties that are ascertained by the framework/OS independently of the cloud storage providers. The file sync properties and corresponding states relate to synchronization status such as whether a file is available or not, located online or offline, actively downloading (e.g., in progress), queued for downloading, synchronized or unsynchronized with the service, or associated with an error, to name a few examples.

In one or more implementations, file sync properties are related to corresponding states through a mapping data structure that maps file sync property values to different states. The mapping data structure may be configured as a table, a database, a library file (e.g., dll), a decision tree implemented in code, logic instructions, or other suitable data structure that may be employed to look-up and/or evaluate states based on property values. The framework utilizes and references the mapping data structure to match file sync properties identified for cloud content files to corresponding states and then set states for the cloud content files accordingly. In an example approach, the mapping data structure defines an ordered list of states that is employed in a deterministic manner to assign states to files. When the ordered list is employed, determinations of state for a file occurs by evaluating file sync properties against states in the mapping data structure in the defined order until a matching state is found. The matching state is then selected and assigned to the file.

The cloud content states framework and determination logic techniques described herein provide a mechanism for identifying and using states for cloud content across different kinds of views. Different cloud storage providers may take advantage of the framework, which makes it easier for the providers to support state information. The user experience is enhanced because a consistent set of states and presentation of the states is employed across multiple providers, applications, and file system views. Moreover, states are controlled by the framework and/or OS and as such accurate representations of file state is not dependent upon connectivity to a network or individual services.

In the following discussion, an example environment is first described that may employ the techniques for cloud content states described herein. Example scenarios, user interfaces, and procedures are then described, which may be implemented in the example environment as well as other environments. Thus, example scenarios, user interfaces, and procedures are not limited to the example environment and the example environment is not limited to the illustrative examples. Lastly, an example system and components of the system are discussed that may be employed to implement aspects of the techniques described herein.

Example Environment

FIG. 1 is an illustration of an environment 100 in an example implementation that is operable to employ techniques described herein. The illustrated environment 100 includes a client device 102, an other client device 104, and a service provider 106 that are communicatively coupled via a network 108. The client device 102, other client device 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, handheld game consoles). Additionally, although a single computing device is shown in some instances, the computing device may be representative of a plurality of different devices, such as multiple servers of the service provider 106 utilized by a business to perform operations, and so on. Further examples of computing systems and devices suitable to implement techniques described herein are described below in relation to FIG. 7.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client device 102 is further illustrated as including an operating system 110. The operating system 110 is configured to abstract underlying functionality of the underlying device to applications 112 that are executable on the client device 102. For example, the operating system 110 may abstract processing, memory, network, and/or display functionality such that the applications 112 may be written without knowing "how" this underlying functionality is implemented. The application 112, for instance, may provide data to the operating system 110 to be rendered and displayed by a display device as illustrated without understanding how this rendering will be performed. A variety of applications 112 typically associated with client devices are contemplated including, but not limited to, a productivity suite that integrates multiple office productivity modules, a web browser, games, a multi-media player, a word processor, a spreadsheet program, a photo manager, and so forth.

The client device 102 is also illustrated as including a file system 114 and a cloud content manager 115. In this example, the file system 114 and cloud content manager 115 are depicted as being implemented as components of the operating system 110. Alternatively, one or both of the file system 114 or cloud content manager 115 may be provided as a standalone application and/or as a component of another application 112.

The file system 114 represents functionality to define and control the way in which files are named and where they are placed logically for storage and retrieval. The file system may employ a hierarchical (tree) structure. In this approach, files are organized in directories (or folders) that correspond to space in memory allocated to the files. The file system 114 also includes a format for specifying the path to a file through the structure of directories. The file system 114 can employ paths that point to various storage locations, such as an internal hard drive, an external storage device, and network file locations. In accordance with techniques described in this document, the file system 114 also supports enumeration of cloud content files associated with one or more online providers. The file system 114 in conjunction with the operating system 110 exposes the cloud content files in various view of the file system structure alongside and in the same manner as local, offline files.

The cloud content manager 115 represents client-side functionality to enable various synchronization of various files over the network 108. For example, the client device 102 may include local storage 116 that may be used to store local files as well as cloud content 118 the may be synchronized with other devices (e.g., "synched files"). The cloud content manager 115 may operate to connect to multiple cloud content services provided by service providers 106 to perform file synchronization and related operations. By way of example, cloud content 118 is shown in FIG. 1 as being associated with both the client device 102 and other client device 104. In this context, cloud content 118 may represent local versions of files that are maintained in respective local storage 116 of multiple different devices and that may be synchronized across the multiple different devices via cloud content managers 115 deployed to the devices. The cloud content 118 may also include representations for and/or links to un-synced files that are maintained in remote, online storage accessible via cloud storage providers. As noted, the file system 114 is configured to manage and provide representations of both local and online files in common views available via the operating system 110 and through file access functionality of various applications 112. Additionally, state information associated with the files can be exposed to provide indications regarding the status of the files in the manner described herein. The file system representations and state information may be presented in various different forms and views via user interfaces 120 output via the operating system 110 and/or different applications 112.

In particular, the cloud content manager 115 further represents functionality to implement the cloud content states framework and determination logic as described above and below. The framework enables state information to be associated with cloud content files and used in conjunction with various views of file system representations that include cloud content files. The framework may define and control a set of primary states that relate to synchronization status of the files. Thus, icons or other state indicators defined for the primary states may be shown along with items in file system representations to visually display synchronization status of corresponding cloud content files. Additionally, the framework supports custom states that may be used alongside with the primary states to extend the framework and support custom interaction scenarios. Details regarding these and other aspects of techniques to implement cloud content states are discussed in relation to the following figures.

The service provider 106 includes functionality operable by the service provider 106 to manage various resources 122 that may be made available over the network 108. For example, various resources 122 may be provided via webpages or other user interfaces 120 that are communicated over the network for output by one or more clients via a web browser or other client application. The service provider 106 manages access to the resources 122, performance of the resources, and configuration of user interfaces 120 to provide the resources 122, and so on. The service provider 106 may represent one or more server devices used to provide the various resources 122.

Generally, resources 122 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 122. Content may include various combinations of text, multi-media streams, documents, application files, photos, audio/video files animations, images, web pages, web applications, device applications, content for display by a browser or other client application, and the like.

One particular example of a resource 122 that may be provided by a service provider 106 is a cloud storage service 124 as depicted in FIG. 1. The techniques described herein are applicable to multiple different cloud storage services that may be provided by multiple different service providers (e.g., multiple cloud storage providers). In this context, the cloud storage service 124 is representative of functionality operable to provide and manage online storage 126 that may be allocated to user accounts associated with a service provider 106. The online storage 126 provides users with storage "in the cloud" for cloud content 118 such as documents, application files, photos, mobile uploads, and audio/video files so users may access their content items from anywhere over the network 108, and share content to collaborate with others. The cloud storage service 124 also enables users to synchronize files across multiple different devices designated by the users. Multiple cloud storage services provided by third parties (e.g., other providers) may also provide respective storage and file synchronization. Thus, cloud content 118 may be synchronized across multiple devices via different cloud storage services through interaction with corresponding cloud content managers 115 deployed to client devices.

As represented in FIG. 1, respective versions of files corresponding to cloud content 118 that is associated with a particular cloud storage service 124 may be stored locally by each client device in local storage 116. In addition or alternatively, the file system 114 may include links to and representation of content that is maintained in the cloud, such as un-synced files or files that are designated for online access only. Generally, the cloud storage service 124 is also configured to store respective versions of at least some files in online storage 126 for online access in addition to storing and synching of content locally at each device.

Clients may access the cloud storage service 124 and other resources 122 provided by a service provider 106 through client/user accounts to which the clients are authenticated. For instance, to access resources 122, a client device may provide a username and password that is authenticated by an authentication service. When the authentication is successful (e.g., the client "is who they say they are"), the authentication service may pass a token (or other suitable authentication identifier/secret) to enable access to corresponding resources. A single authentication may correspond to one or more resources, such that authentication to a single account by a "single sign-on" may provide access to individual resources, resources from multiple service providers 106, and/or to an entire suite of resources available from a service provider 106.

Cloud Content States Determination Logic

Having considered the foregoing discussion of an example operating environment, consider now further details regarding techniques to implement cloud content states determination logic described in this section. In particular, aspects of a cloud content states framework are discussed in relation to example scenarios, user interfaces, and techniques represented and described in relation to FIGS. 2 to 7.

Presenting Cloud Content States

Figure 2:
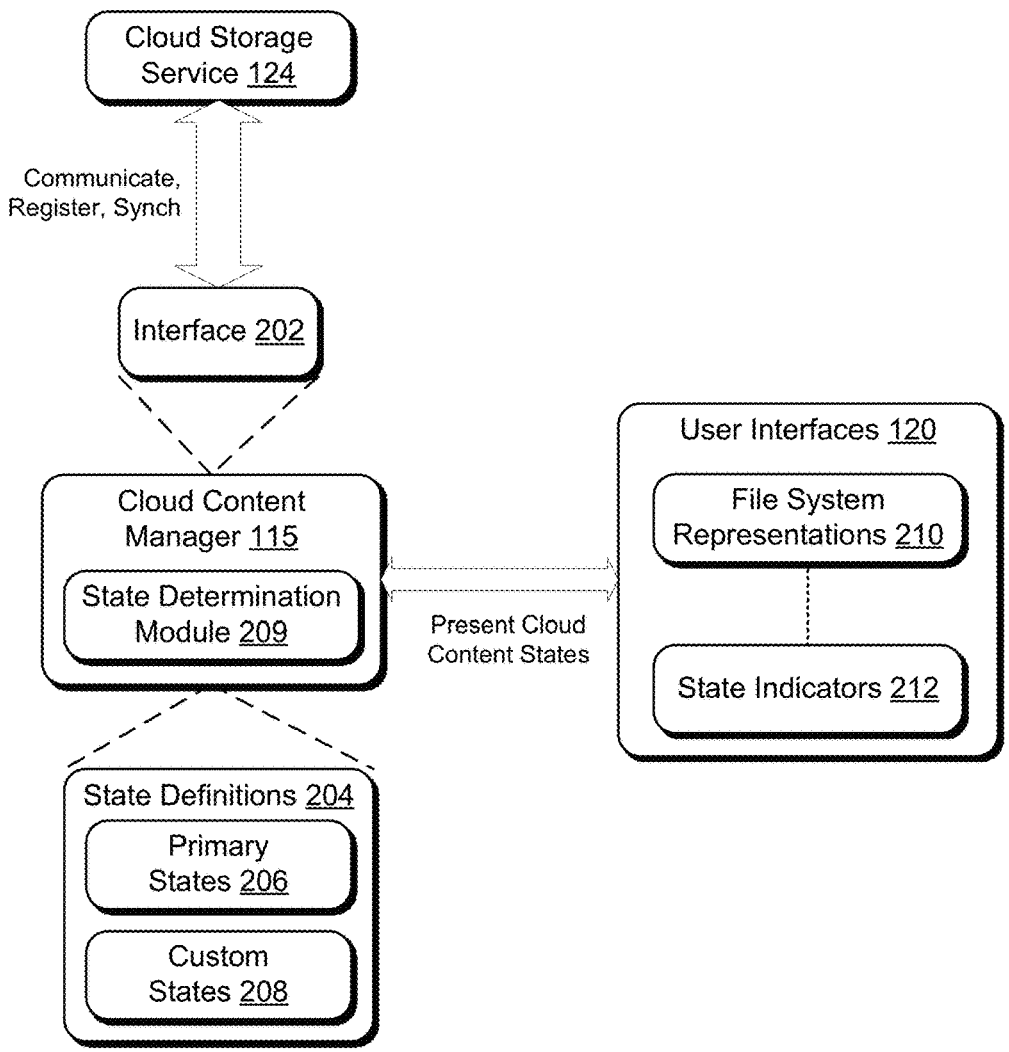
FIG. 2 is a diagram depicting an example scenario for presenting cloud content states in accordance with one or more implementations.

FIG. 2, depicts a diagram showing an example scenario for implementing cloud content states, generally at 200. In particular, FIG. 2 represents interactions and operations that may occur between a cloud content manager 115 and a cloud storage service 124 to present cloud content states. As represented the cloud content manager 115 may expose an interface 202 that enables cloud storage services 124 to communicate with and interact with the cloud content manager 115. Various formats and protocols for the interface 202 are contemplated. In an implementation, the interface 202 is configured as an application programming interface (API) designed to enable multiple cloud storage services to plug-in to the framework supplied for management of cloud content on behalf of the multiple cloud storage services. Generally, the interface 202 enables cloud storage services 124 to communicate, register, and synchronize files with cloud content managers 115 deployed to one or more end user devices. The interface 202 also facilitates creation and deployment of custom states as described herein.

The cloud content manager 115 includes or makes use of a collection of state definitions 204 that define states available for cloud content 118. Generally, the state definitions 204 include a description of the state, an icon or other state indicator to represent the state, and criteria used to establish when the state applies to content items. State definitions 204 may also include indications of priorities for the states, which are used to control handling, ordering, and presentation of states based on the priorities. The state definitions 204 include at least a set of primary states 206. The primary states 206 are a set of standard states defined by and controlled by the framework/OS. The primary states 206 are intended to be made available to and used across multiple different cloud storage services 124. By doing so, the state representations are consistent and readily understandable to users no matter which service or services the users choose to utilize for cloud storage. Primary states 206 may be implemented in various ways details of which are discussed in relation to FIG. 3 below.

The state definitions 204 may also optionally include custom states 208 that are defined by individual providers for use with content associated with those providers. The custom states 208 may be defined and updated via the interface 202. A custom state may be used exclusively with content associated with a particular provider that created/deployed the state. It may also be possible for providers or users to share customs states to provide extended functionality.

The cloud content manager 115 may also include or make use of a state determination module 209 that represents functionality to implement determination logic as described above and below. By way of introduction, determination logic for the cloud content states framework is utilized to make state determinations for cloud content files in dependence upon a defined set of file sync properties and cause the states for the cloud content files to be set accordingly. Details regarding state determinations are discussed below in a section titled "Cloud Content States Determination Logic."

Based on states that are assigned to cloud content files, the cloud content manager 115 references and utilizes the state definitions 204 to present the states along with representations of content in various user interfaces 120. Cloud content states associated with cloud content files may include either or both of primary states 206 or custom states 208. A particular cloud content file may be associated with different states at different times. Moreover, at a given point in time one or multiple states may be assigned to a particular cloud content file. Additionally, state information for a file may be undefined or blank (e.g., no specific state is assigned).

Cloud content manager 115 causes the information regarding cloud content states to be presented in conjunction with different views of file systems representations 210. For instance, file systems representations 210 exposed in user interfaces 120 associated with the operating system 110, file system 114, and/or various applications 112 may include state indicators 212 to represent states associated with content items. The state indicators 212 may be configured as icons or other graphic elements assigned to different states. Presentation of the state indicators 212 is controlled via the cloud content manager 115 and/or the corresponding framework implemented by the device/operating system 110. Thus, the state indicators 212 are maintained by and rendered directly via the framework as part of the file system instead of being implemented at the application level by individual providers/applications using overlays. State indicators 212 may be utilized to provide cloud content state indications in various views, throughout the device user experience, and across various different applications and devices. For example, file icons and folders, lists of recently used documents, favorites list, pinned documents, links and/or other references to documents presented within an application user interface, and other file systems representations may be rendered to include state indicators 212 indicative of corresponding states that are associated with content items.

Cloud Content States Determination Logic

In accordance with techniques described herein, the cloud content states framework is configured to implement determination logic operable to make determinations regarding states associated with cloud content and assign appropriate states to files. The states assigned to file may then be utilized in various ways including, but not limited to, using the states to enable presenting of state indicators 212 in connection with different file representations as discussed in this document. The determination logic may be implemented via a state determination module 209 as previously noted and/or other functionality provided by the framework and/or OS.

Generally, determination logic for the cloud content states framework is utilized to make state determinations in dependence upon a defined set of file sync properties. The file sync properties may include existing metadata associated with files as well as newly defined metadata. The framework is configured to collect, parse, and extract metadata from one or more sources to ascertain file sync properties indicative of the current status of individual cloud content files. File sync properties reflect aspects such as file locations, service identification, designations of the file as being pinned or not pinned, file modifications, sync progress, and so forth. File sync properties may be ascertained by examining different sources of metadata including file system and file format metadata, provider supplied supplemental metadata, metadata pertaining to service representations of files, provider identification metadata, volatile file properties such as for sync errors and sync progress, and so forth.

Thus, the framework operates to make assessments of the file sync properties and set states for files in accordance with the assessments. The file sync property assessments may rely upon indications regarding properties that are asserted by cloud storage providers and indications regarding properties that are ascertained by the framework/OS independently of the cloud storage providers. In one or more implementations, file sync properties are related to corresponding states through a mapping data structure that maps file sync property values to different states. The mapping data structure may be configured as a table, a database, a library file (e.g., dll), or other suitable data structure that may be employed to look-up states based on property values. Details of an example mapping data structure are discussed below in relation to FIG. 4.

The framework utilizes and references the mapping data structure to match file sync properties identified for cloud content files to corresponding states and then set states for the cloud content files accordingly. In an example approach, the mapping data structure defines an ordered list of states that is employed in a deterministic manner to assign states to files. When the ordered list is employed, a determination of state for a file occurs by evaluating file sync properties against states in the mapping data structure in the defined order until a matching state is found. The matching state is then selected and assigned to the file.

In this context, the determination logic implements a set of principles, rules, properties, settings and states that are used for state assessments and to assign states to files. The particular principles, rules, properties, settings and states defined and used may be different in different implementations. By way of example and not limitation, in the section titled "Example Implementation", below, details are provided of example implementations that illustrates select concepts, which may be used to establish determination logic in various different implementations. However, the inventive techniques for cloud content states determination logic are not intended to be limited to the details and concepts discussed in relation to the example implementation. For example, the icons used to represent states, order and priority of states, particular properties and states defined, and other aspect may vary across different scenarios and implementations.

Cloud Content States and Indicators

As noted, the cloud content states framework defines and controls a set of primary states 206 that relate to synchronization status of the files. Icons or other state indicators 212 defined for the primary states may be shown along with items in file system representations to visually display synchronization status of corresponding cloud content files. The primary states 206 and corresponding state indicators 212 may be configured in various ways.

In general, the primary states 206 are a set of established states designed to be shared across different cloud storage providers. The primary states 206 deliver a consistent representation of states across views, applications, devices, and platforms. Although custom states may be supported, the primary states 206 may be assigned higher priority than custom states. States may be handled, listed, ordered, and managed based at least in part on corresponding priorities. Consequently, in visual representations including multiple state indicators, primary states are placed in locations considered to be the most prominent with additional states being arranged around the placement of primary states. Additionally, the primary states 206 may be optionally implemented as a fixed set of states that cannot be overridden or replaced by customs states or icons.

Different numbers and types of primary states 206 may be utilized in different implementations. Visual indicators 212 for the states may use various combinations of designs, graphics, colors, text, images, animations, and so forth. By way of example and not limitation, FIG. 3 is a diagram that depicts generally at 300 details regarding an example set of primary states 206 and corresponding representations that may be employed in one or more implementations. The primary states 206 are associated with a set of corresponding icons 302 and representations 304 of states that make use of the icons 302. In this example, the icons 302 include at least checkmark icon 306 used to represent files available offline and synched, an arrow icon 308 to represent status as synching or pending download, and an x-out icon 310 to represent an error state. Additionally, status as being available only online (e.g., not available offline) may be represented by not showing one of the icons 302 with an item. In other words, absence of one of the defined icons 302 with an item is an indication that the item is not available locally at a device.

In this context, representations 304 may be defined for files and folders that use the icons to represent various state information for underlying content items. In the depicted example, the primary states 206 that are available include example states 312 to 322 shown in FIG. 3. In particular, the example states include available offline and synched 312, online only file: available 314, synching/pending download 316, progress on download 318, error state 320, and online only file: not available 322. As noted, these enumerated states are intended as illustrative examples and various different and/or additional states may be defined and employed for a set of primary states 206 in different implementations.

Different combinations of the icons 302 with file system representations of the files and folders (e.g., file icons and folder icons) are constructed to represent the different states and examples of which are shown in rows below the corresponding states in FIG. 3. For example, the representation of a file for available offline and synched 312 is produced by rendering the checkmark icon 306 in proximity to the file icon. In this example, checkmark icon 306 is arranged as a small graphic placed below and to the left side of the file icon, though, other arrangements may be employed for different views and in different implementations. Other icons to represent other states may be associated with file icons in a comparable manner Generally, the state representations for folders are also produced in the same way. It is noted, though, that state representations for folders may differ from representations for individual files since the folders may contain multiple files each associated with different states. The state representations shown for a folder may be selected to provide an overall state derived for multiple individual files contained in the folder.

The progress on download 318 state is employed for files that are actively downloading. In implementations, the progress on download 318 state for files may be represented using a progress bar that is updated as the download is occurring to show progress and/or time remaining. Notice, however, that the corresponding folder may use the arrow icon 308 instead of a progress bar since a progress bar may not be applicable to each file in the folder. This is an example of a scenario in which the state representations for a folder reflects an overall state derived for multiple individual files in the folder and the folder state differs from representations for individual files.

Further, availability of files as being on-line only files is represented by not showing one of the icons 302 with corresponding items. This approach is reflected for both online only file: available 314 and online only file: not available 322 states. Additional visual indications may be used to distinguish between available and unavailable files. Availability may depend upon network connectivity, service availability, access permissions, account log-in status, and so forth. Here, the unavailable files and folders are represented as being "grayed-out" to show that the files are not currently accessible. Another approach is to define different indicators for available and unavailable files. Still further, a custom state could be defined and used to reflect availability in addition to primary state representations.

Example Mapping Data Structure

By way of example and not limitation, FIG. 4 is a diagram that depicts generally at 400 details regarding an example mapping data structure that may be employed in one or more implementations. In this example the mapping data structure is represented as a table 402 that maps states 404 to corresponding state indicators 406 and determination logic 408. In this example, the table 402 is configured for deterministic analysis of files and folders. Thus, the states in the table are listed in a defined order of evaluation from top to bottom. Processing to find a correct state given a set of properties for a file occurs by evaluating each state in the table according to the determination logic 408 in sequence until a match is found. The processing reflected by the table 402 may be implemented via a state determination module 209 or other functionality integrated with the framework discussed herein.

Generally, the determination logic 408 for each state defines one or more operations to assess file sync properties against criteria specified for a corresponding state. When the criteria for a listed state is satisfied, then the corresponding state is selected and assigned to the cloud content item under evaluation. If the criteria are not satisfied, then the analysis progresses to evaluation of the next listed state and so on until a match is found. The table 402 has separate decision trees and lists for evaluation of files and folders.

Example Primary State Representation

Once a state has been assigned to cloud content, the state may be employed in various ways. For example, computing resources for file management may be allocated according to the states. In another example, states may be used to filter and/or selectively process files having different states in different ways. Additionally, the states may be employed to provide state indicators 212 to reflect the states in connection with file system representations in accordance with various examples and techniques discussed herein.

For instance, the cloud content states framework implemented via a cloud content manager 115 is operable to configure user interfaces 120 to include state indications in any suitable way. State indications may be made available across the device user experience and in various different views of file system information. In one or more implementations, the framework defines and enforces principles for configuration of the user interfaces 120 and arrangement of state indicators 212 with the UIs and different views. As noted, states and corresponding state indicators 212 may be handled and arranged based at least in part upon priorities assigned to the states. The precise locations in which state indicators 212 are placed, the order of placement, and selection of which states to show, though, may change depending upon the particular view and for different implementations.

While the placement of state indicators 212 relative to cloud content file representations may vary, in at least some implementations the framework is configured to place the state indicators 212 so that the indicators do not interfere with the cloud content file representations. Consequently, the state indicators 212 may be placed in positions proximate to file/folder icons, but outside visual boundaries of the file/folder icons. In this approach, the state indicators 212 do not overlay the visual boundaries or interfere with filenames or other textual labels. Additionally, placement of state indicators 212 may further depend upon the size of the file/folder icons and the layout of the view. For example, state indicators 212 may be placed in a dedicated column within a list view whereas the state indicators 212 may be positioned in closed proximity to visual boundaries of file/folder icons in icons views.

Figure 5:
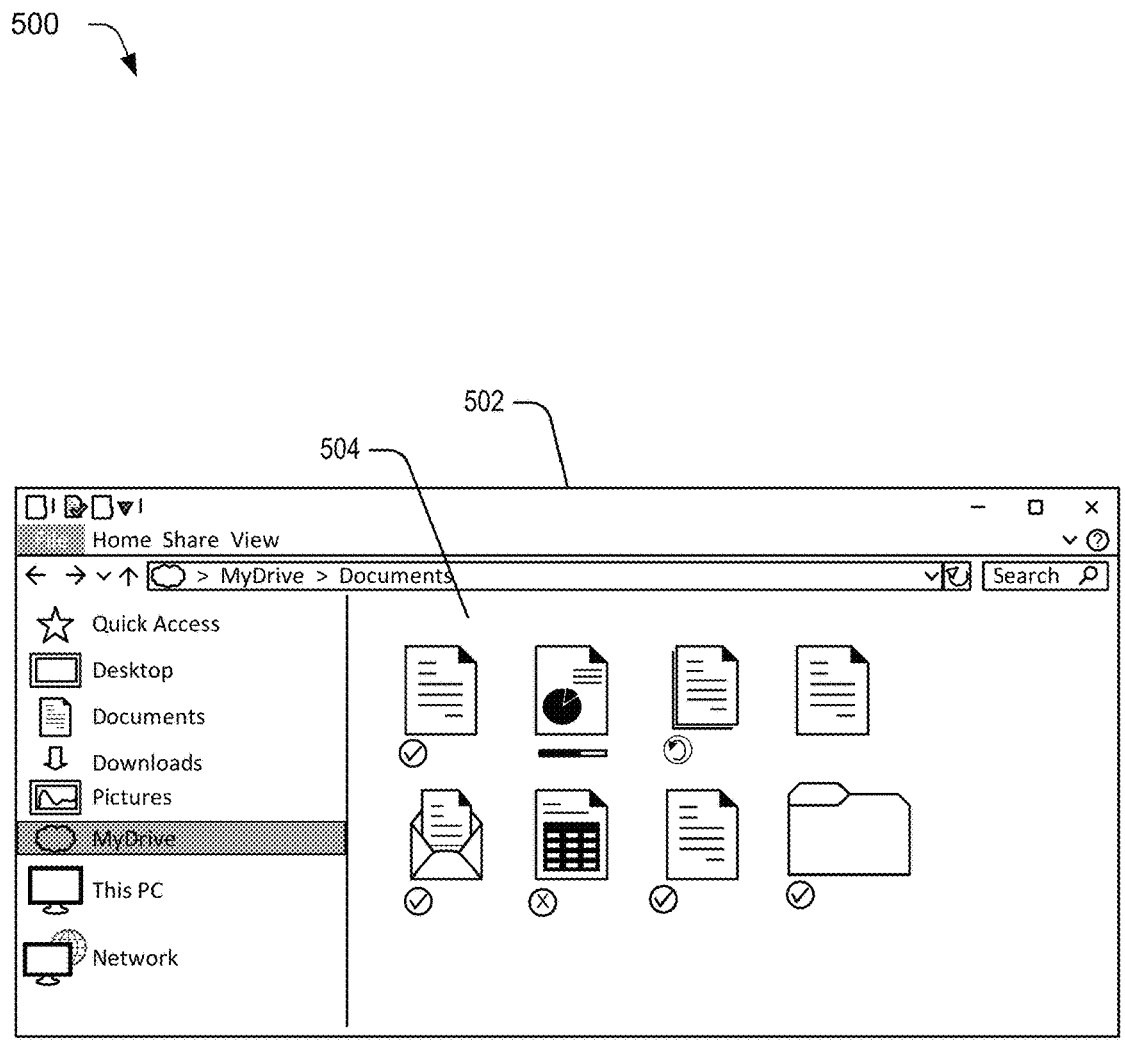
FIG. 5 is diagram depicting an example user interface having an icon view of a file system representation in accordance with one or more implementations.

As but one illustrative example, FIG. 5 is a diagram depicting generally at 500 an example user interface 502 having an icon view of a file system representation in accordance with one or more implementations. The example user interface 502 includes a pane 504 having a view of a file system representation. In this example, the file system representation shows icons for a collection of files and folders associated with a particular file storage location. The file storage location may be associated with a cloud storage service 124 with the files contained therein being managed via the file system 114 and/or a cloud content manager 115.

The file system representation also includes state indicators 212 that are associated with the file and folder icons in accordance with the techniques described herein. The state indicators 212 are included for primary states 206 that may be determined by the framework/OS in accordance with cloud content states determination logic as discussed above and below. The state indicators 212 may be associated with and arranged relative to representations for particular items in accordance with principles discussed above and below. For instance, in the icon view shown in FIG. 5, different state indicators 212 for primary states 206 are shown for different items. In instances, in which multiple states are shown for an item, the primary state 206 may be represented in a priority position or slot, which in this example is the left most position. The positioning of the multiple state indicators is controlled in dependence on priorities. Consequently, indicators may be arranged from left to right with primary states shown first and any custom states shown thereafter. The state indicators 212 are aligned underneath corresponding file/folder icons in relatively close proximity to visual boundaries of the file/folder icons.

A variety of different configurations of UIs and arrangements of state indicators 212 for the UIs are contemplated in addition to the illustrative example of FIG. 5. In general, state indicators 212 determined using determination logic as discussed herein may be utilized in various ways to convey information regarding states for the cloud content 118. Different arrangements of the state indicators 212 may be utilized in different views of file system representations (e.g., list view, icon view, detail view, etc.). Moreover, state indicators 212 may be utilized across different applications and throughout the user experience wherever file system representations are exposed.

Example Implementation

Consider now example implementations that illustrate select concepts, which may be used to establish determination logic in various different implementations. However, the inventive techniques for cloud content states determination logic are not intended to be limited to the details and concepts discussed in relation to the example implementation. For example, the icons used to represent states, order and priority of states, particular properties and states defined, and other aspect may vary across different scenarios and implementations.

Files may be defined as normal files or placeholders in the context of a file system. Placeholders correspond to cloud content 118 or "cloud files" that are managed by a sync engine/sync client associated with a cloud storage provider. In some cases, the primary data stream may be absent. In the context of this implementation example, a normal file corresponds to a local file that is not yet managed by a sync engine, whereas a placeholder file corresponds to a synced "cloud file" or cloud content 118.

Placeholder files may be differentiated based upon whether they are complete or not. For example, a partial placeholder file corresponds to a sync engine managed file with an incomplete or completely absent primary data stream, whereas a full placeholder file corresponds to a sync engine managed file or folder where the primary data stream for the file or folder is complete.

Placeholders can be differentiated through the presence of sync provider identification metadata. For example, partial placeholders will have a specific new reparse tag (TAG_CLOUD) and will also have the existing FILE_ATTRIBUTE_OFFLINE bit to signify that the data is not immediately available and will cause most file scanners to skip them. The FILE_ATTRIBUTE_SPARSE_FILE attribute will also be set for partial placeholders indicating that the primary data stream is not fully present.

The file system can provide assistance in determining files or folders that may have been renamed or modified. This determination can be used to 1) help sync engines make a fast, definitive determination if a file or folder may have been modified, 2) allow the file system to understand which Full Placeholders may be eligible for dehydration to Partial Placeholders, and 3) allow the shell to immediately differentiate files or folders with potential pending changes that require synchronization so this state can be shown to the user.

Notably, this determination is only relevant only for placeholder files because normal files are, by definition, out of sync. In sync placeholder file can be identified through a file attribute: FILE_ATTRIBUTE_IN_SYNC. This value is set in response to the sync engine calling file system placeholder APIs to create placeholders or affirm that an existing placeholder is now in sync.

The file system will automatically strip this attribute (FILE_ATTRIBUTE_IN_SYNC) when any of the following modifications are made to the file or folder: 1) primary data stream write, or 2) file rename (or move within sync scope).

Determination logic for the cloud content states framework operates to make state determinations in dependence upon a defined set of file sync properties. Various different properties and sources of the properties are contemplated. For instance, items can have different types of metadata, and that metadata can be stored in different locations.

In this case, metadata can include existing types of metadata associated with a file system, as well as new types of metadata that are defined by the framework and associated with a placeholder file (e.g., cloud content 118). Existing types of metadata include "filesystem metadata" (e.g., Name, Date, Modified, Size, Attributes, Reparse Tag) that is stored directed by the filesystem and represent basic file attributes for placeholders and other files. Existing types of metadata also includes "file format metadata" (E.g., Music Artist, Photo Tags, Document Author) which corresponds to supplemental or extended information such as a music artist or a document author which are stored within a file type's file format and are extracted via a format-specific property handler. Some file formats support "open metadata" meaning they can store arbitrary data, but not all file formats do.

Various types of metadata are available in stores that are stored in different locations. Such metadata stores include file system directory entry, primary file stream, alternate data stream, indexer, and sync provider store. The filesystem directory entry contains filesystem metadata that's persisted on disk, independent of file type. The primary file stream contains metadata that's extracted by file type specific handlers and is configured to contain file format metadata. The alternate data stream is directly managed by the file system to facilitate access (no sharing violations) and prevent tampering (no accidental interference by other apps). The indexer caches indexable properties available in other data stores, as well as provides the ability to store in-memory properties and can also provide complex aggregation, inheritance or bubbling-up logic for properties that are expressed on items to be reflected in parent or child items. The sync provider store typically includes their own storage or database of metadata. Notably, the different classes of metadata described above may be stored in these various different metadata stores.

The cloud states framework exposes a property interface that may be employed to represent properties associated with files. The property interface may be used by the file system and cloud storage providers to specify properties, and provides an implementation of a property store that runs on top of the alternate data stream and in turn populates the indexer.

Separate serialization blobs may be used for granular separation of file format metadata and provider identifying/supplemental metadata. When hydrating a placeholder (e.g., downloading the data stream and/or populating metadata fields with values), the filesystem can drop the file format metadata from the alternate data stream as the file format metadata will be completely present in the primary file stream. When moving files out of the sync root, the filesystem can drop all alternate file stream metadata.

The sync engine/providers can bind to and write to property store using APIs or other constructs exposed by the cloud states framework. When syncing changes from the cloud, the cloud storage provider updates the alternate file stream metadata at the same time as it updates other placeholder metadata.

Users can explicitly request that a file always be available offline and/or hydrated on a particular machine. Similarly, they can make the same request on a folder which implies an action on children contained within. There are three pinned "states", which include 1) pinned—indicating a user promise that the content will be made available offline, 2) unspecified—which make no user promise, and 3) unpinned—which makes a promise to the user that new service content will not be hydrated. To support this marking, the filesystem will add a new attribute: FILE_ATTRIBUTE_PINNED, and the presence of the FILE_ATTRIBUTE_OFFLINE will be utilized on folders to indicate when a folder is unpinned. The concept of pinning is a local machine state and is not expected to be synchronized across machines. In addition, it should be noted, that a folder with both Pinned and Offline bits set are presumed to be 'Pinned' even though the system code will never specifically establish that state, but should expect it to be possible.

There are a variety of user operations that may be exposed by the framework for files and folders and their resulting behavior. For example, file context menu commands may include "make available offline" and "make available online only". The command make available offline causes the system to set the file as "pinned" and ensures that the file is always available offline, and causes the file to be immediately downloaded if it is not currently available. The command make available online only causes the system to "set unspecified request dehydrate" and causes the system to free up the disk space that the file is currently occupied.

Folder content menu commands may also include the commands "make available offline" and "make available online only". In this case, the command make available offline recursively sets all files and folders as "pinned", and ensures that all current and future files under this subtree are available offline. The command make available online only, in contrast, recursively sets all files as "unspecified" and requests dehydrate for each as well as recursively sets all folders as "unpinned". Notably, selection of this command frees up disk space from all files in this subtree and ensures future files form the service do not take up disk space.

Inheritance rules are executed at the time of file or folder operations and therefore are ensured by the filesystem filter to provide a consistent implementation across multiple cloud storage providers. File operations include "new file" and "copy or move file to new parent". For the operation "new file", if the parent folder pin state is "pinned", then the new file will also be "pinned". If the parent folder pin state is unspecified or unpinned, then the new file will be assigned the pin state of "unspecified". For the operation "copy or move file to new parent", if the current state of the file is pinned, then the resulting pin state will also be pinned regardless of the parent folder pin state. However, if the current state of the file is unspecified, then the resulting pin state will be pinned if the parent pin state is pinned, and will be unspecified if the parent pin state is unspecified or unpinned.

Folder operations include "new folder" and "copy or move folder to new parent". For the operation "new folder", if the parent folder pin state is "pinned", then the new folder will also be "pinned", if the parent folder pin state is unspecified, then the new folder will be assigned the pin state of "unspecified", and if the parent folder pin state is unpinned, then the new folder will be assigned the pin state unpinned. For the operation "copy or move folder to new parent", if the current state of the folder is pinned, then the resulting pin state of the folder will also be pinned regardless of the parent folder pin state. However, if the current state of the folder is unspecified, then the resulting pin state of the folder will be pinned if the parent pin state is pinned, will be unspecified if the parent pin state is unspecified, or will be unpinned if the parent pin state is unpinned. If the current state of the folder is unpinned, then the resulting pin state will also be unpinned regardless of the state of the parent folder.

The sync engine expectations are as follows: 1) Watch for the arrival of the Pinned state (FILE_ATTRIBUTE_PINNED) on a file that hasn't yet been hydrated. Queue the file for hydration. Prioritize the hydration above hydration requests that were not driven directly by the user; 2) prompt to dehydrate a file in the Pinned state (requires clearing it and asking the user if it's OK); 3) prompt to hydrate new files arriving in an Unpinned folder; 4) implement an explicit Dehydrate request API that the shell will use to request dehydration. This API is called for files not available for dehydration (pending synchronization).

File System Representation are configured to represent key visual states. A file or folder is associated with a single primary state. In implementations, secondary custom states are supported and may be represented along with primary state indicators The determination of state may occur in dependence upon a mapping data structure such as a database, table, shared library, or other structure. The mapping data structure maps file sync properties to corresponding states and state indicators. The mapping data structure maps also defines determination logic employed for state assessments. Thus, once properties of an item are discovered, the mapping data structure may be referenced to look-up the appropriate state and assign the state to the item. The mapping data structure may be implemented as a table such as the example illustrated in FIG. 4 above. In one approach, the mapping data structure defines an ordered list of states that is employed in a deterministic manner to assign states to files. When the ordered list is employed, a determinations of a state for a file occurs by evaluating file sync properties against states in the mapping data structure in the defined order until a matching state is found. The matching state is then selected and assigned to the file.

The table of FIG. 4 represents mapping of states to state indicators based on assessment of properties as specified by the determination logic. In this example, the table is configured for deterministic analysis of files and folders. Other approaches to match properties to states are also contemplated. The state indicators are intended as illustrative examples and different indicators may be used across different scenarios and implementations.

Note that some states in the example table have identical visual indicator, but are represented separately to allow for 1) Use of the more detailed state information in descriptive text (such as tooltips), and 2) an easy introduction of differentiated visual state, if required.

Consider now, an example process for namespace population:

1) Sync Engine creates Placeholders for sync managed files and folders under the namespace. Always start files as Partial Placeholders to expedite namespace population. Note that the Sync Engine registers a banner for their sync root during this period to indicate that the user's data is not yet complete (avoid fears of data loss).

2) Sync Engine Downloads and applies Supplemental Sync Properties and File Format Properties once Partial Placeholders have been fully created. Optionally skip File Format Properties for files that will have their primary data stream downloaded.

3) Sync Engine optionally queues download and requests hydration of the Primary Data Stream for files based upon heuristics that favor establishing full placeholders for a user's most valuable content (documents, recent, etc.) while being considerate of disk and network utilization requirements. In this step, the Sync engine may optionally set the Volatile Property: Pending Download on all files it intends on populating. The Sync engine may also request hydration of each file awaiting download, running a small number of requests in parallel for throughput. The Download Progress volatile property may be set by the shell automatically. Completing hydration of a file removes the Pending Download and Download Progress properties automatically.

Consider now an example process for detecting local changes:

The Sync Engine will watch for the arrival of files or folders without the FILE_ATTRIBUTE_IN_SYNC attribute (signifying new content to be uploaded or a modification of existing content which may require uploading). When uploading file modifications, set the Volatile Property: Upload Progress as the file's contents are uploaded.

2) Once the new content or change has been synchronized with the service, the file system placeholder APIs are called to affirm that the content is in sync with the service and set the FILE_ATTRIBUTE_IN_SYNC attribute. Upload Progress volatile property cleared by shell automatically.

In the example above, step 1 can be performed with existing monitoring systems, but FILE_ATTRIBUTE_IN_SYNC is also available to optimize this.

Consider now an example process for detecting service changes

1) The sync engine monitors to discover service changes.
New Files:

2) For new files, the sync engine proceeds identically to the 'Namespace Population' scenario above with one exception: If the parent folder is marked as Pinned or Unpinned, then the hydration decision (executing Step 3) is already decided. For Unspecified, the same heuristic applies.

Supplemental Property Change:

3) If supplemental property changes are discovered, the sync engine directly updates those properties without other state transitions.

Pure Rename, Attribute, or Time Change:

4) The sync engine directly executes the rename or attribute change once sharing rules allow. The volatile property: 'Pending Download' is set when sharing rules prevent changes to reflect the pending operation. This transition either uses file system supplied APIs to avoid treating this as a user modification or immediately affirms that these changes were provided through sync.

Modified File—not Pinned

5) Modifications for files that are not explicitly Pinned proceed with a single file system API to force dehydration and core properties changes (size, dates, etc.) once sharing rules allow. The volatile property: 'Pending Download' should be set when sharing rules prevent changes.

6) The sync engine then proceeds identically to the 'Namespace Population' scenario above, deciding whether or not to re-download the primary data stream or instead acquire File Format Properties. This determination is a heuristic owned by the sync engine.

Modified File-Pinned

7) The volatile property: 'Pending Download' is set.

2) The sync engine should download the new file on the side in a temporary location, doing a replace file for the existing download once sharing rules allow. The replacement will affirm that the file is in sync and automatically remove the 'Pending Download' attribute.

Having considered an example environment, scenarios, user interfaces, and an example implementation consider now a discussion of some example procedures for cloud content states determination logic in accordance with one or more embodiments.

Example Procedures

The following discussion describes cloud content state techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference may be made to the example environment, scenarios, and user interfaces discussed in relation to FIGS. 1 to 5. In at least some embodiments, the procedures may be performed by a suitably configured computing device, such as a client device that includes or otherwise makes use of a file system 114, a cloud content manager 115, and/or a state determination module 209.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 6:
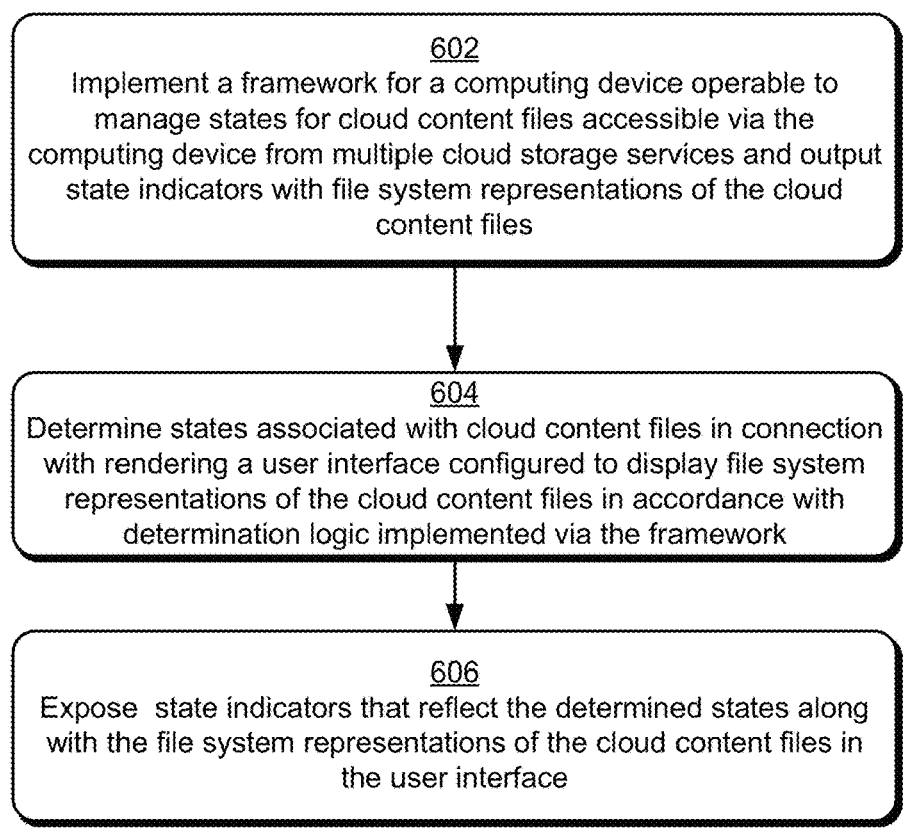
FIG. 6 is a flow diagram depicting an example procedure to determine cloud content states in accordance with one or more implementations.

FIG. 6 is a flow diagram depicting an example procedure to determine cloud content states in accordance with one or more implementations. A framework for a computing device is implemented that is operable to manage states for cloud content files accessible via the computing device from multiple cloud storage services and output state indicators with file system representations of the cloud content files (block 602). For example, a framework as described herein may be implemented in various ways. In one approach, the framework is implemented as a component of an operating system 110 of the computing device. The framework may be implemented via a cloud content manager 115 that is included with the operating system 110, or otherwise invoked by the operating system to instantiate the framework. The cloud content manager 115 may alternatively be provided as a standalone application designed to implement the framework. In one or more implementations, the states supported by the framework include a set of primary states 206 that are indicative of synchronization status provided by the framework. The cloud content files include content synchronized over a network with multiple cloud storage services to facilitate access online access to the cloud content files across multiple devices. The primary states 206 are defined by the framework/OS and controlled by the framework/OS for use across multiple cloud storage services.

States associated with cloud content files are determined in connection with rendering a user interface configured to display file system representations of the cloud content file in accordance with determination logic implemented via the framework (block 604) and state indicators are exposed that reflect the recognized states along with the file system representations of the cloud content files in the user interface (block 606). For example, the framework may be configured to expose state indicators 212 across multiple different views of file system representations as previously described. The different views may be made available through the operating system 110 and/or one or more other applications 112 of a computing device.

In implementations, the framework may operate to interact with cloud storage providers and make assessments of individual files to determine corresponding states. The assessments are made in accordance with determination logic that may be specified via mapping data structure, such as the example table 402 discussed in relation to FIG. 4. The assessments may also be made in dependence upon state definitions 204 that define the various states. Based on the assessments, the framework may associate metadata with the cloud content files to reflect recognized states. Then, to expose state indicators 212, the framework may perform further operations to parse the metadata and ascertain states associated with cloud content files, map the states to corresponding state indicators with reference to the state definitions 204, and render items to represent the cloud content files in a user interface 120 along with corresponding states indicators 212.

Figure 7:
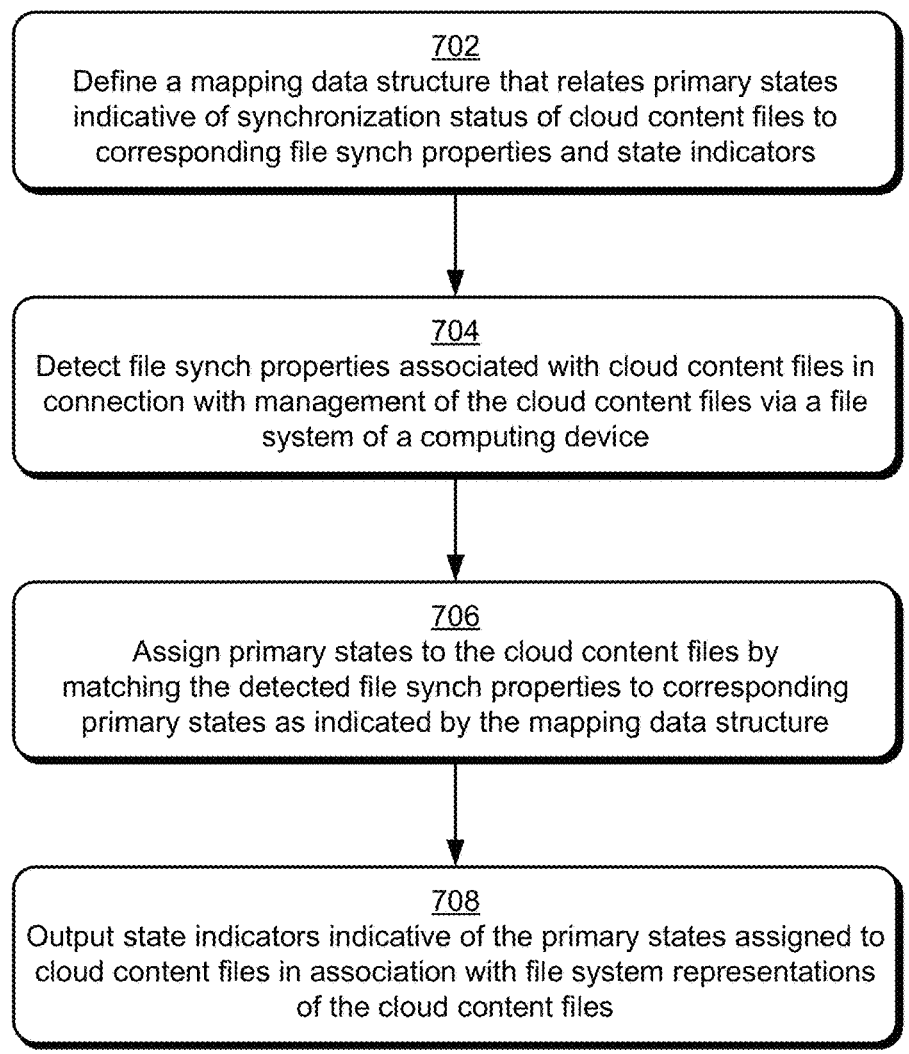
FIG. 7 is a flow diagram depicting an example procedure in which a mapping data structure is employed for cloud content states determinations in accordance with one or more implementations.

In particular, FIG. 7 is a flow diagram depicting an example procedure 700 in which a mapping data structure is employed for cloud content state determinations in accordance with one or more implementations. A mapping data structure is defined that relates primary states indicative of synchronization status of cloud content files to corresponding file synch properties and state indicators (block 702). For example, an operating system 110 may implement a framework to manage cloud content 118 on behalf of cloud storage providers. The framework is further designed to implement a mapping data structure, such as the example table 402 described previously herein. The mapping data structure may be configured in various ways to relate a set of primary states 206 to file synch properties and indicators used for visual representation of the state. The mapping data structure is provided via a framework for use across multiple cloud storage services.

File synch properties associated with cloud content files are detected in connection with management of the cloud content files via a file system of a computing device (block 704). For example, a state determination module 209 or other functionality implemented via the framework may evaluate metadata associated with files to determine values for different properties that are indicative of the current status of the files. Evaluating the metadata may include parsing metadata from one or more sources to ascertain file sync properties indicative of the current status of cloud content files. Then, file sync properties identified for cloud content files are matched to corresponding states with reference to the mapping data structure.

In particular, primary states are assigned to the cloud content files by matching the detected file synch properties to corresponding primary states as indicated by the mapping data structure (block 706). As noted, the matching may occur by cycling through state entries in mapping data structure the provides an ordered list of the state. In this manner, file synch properties are matched to corresponding properties in a deterministic manner In addition or alternatively, a mapping data structure may be provided as a table or database that enables look-up of a state corresponding to a given set of properties. In yet another approach, some property values may operate a keys or identifiers that are mapped to particular states. Thus, a mapping data structure may be configured in various ways to facilitate state determinations and assignment of states to cloud content.

Then, state indicators indicative of the primary states assigned cloud content files are output in association with file system representations of the cloud content files (block 708). For instance, state indicators 212 may be presented in conjunction with various UIs and applications as previously noted. In particular, state indicators 212 indicative of the primary states 206 may be output in connection with multiple different views of file system representations available via the operating system. The views may include at least icon views such as the example of FIG. 5 as well as list views, detail views, and other view options provided via a file system. State indicators 212 may also be employed in connection with other file system representations across the user experience including, but not limited to, lists of recent items; file navigation functionality associated with productivity applications and other applications 112; items pinned to taskbars, start bars, and other user interface constructs; favorite lists; and desktop icons to name a few examples.

Having considered some example procedures, consider now a discussion of an example system and components of the system that can be employed to implement embodiments of the techniques for recognizing cloud content described herein.

Example System and Device

Figure 8:
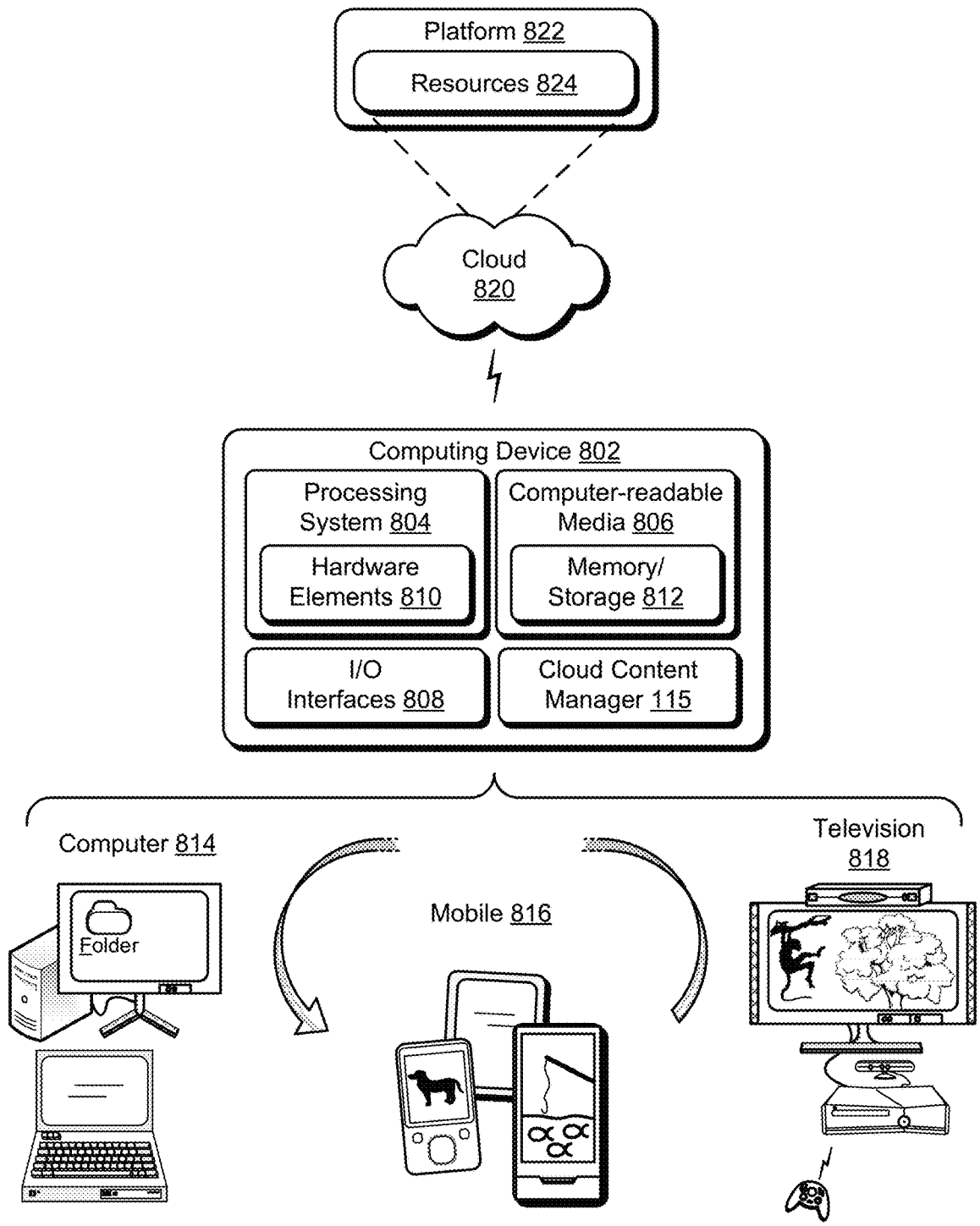
FIG. 8 illustrates an example system including various devices and components that can be employed to implement aspects of the cloud content states determination logic techniques described herein.

FIG. 8 illustrates an example system generally at 800 that includes an example computing device 802 that is representative of one or more computing systems and/or devices that may implement the various techniques described herein. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Computer-readable storage media does not include signal bearing media, transitory signals, or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" may refer to a signal-bearing medium that is configured to transmit instructions to the hardware of the computing device 802, such as via a network. Communication media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including applications 112, file system 114, cloud content manager 115, state determination module 209 and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the cloud content manager 115 on the computing device 802. The functionality of the cloud content manager and other modules may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device that includes a processor, the method comprising:
   implementing a framework for the computing device to manage states for cloud content files accessible via the computing device from multiple cloud storage services and output state indicators with file system representations of the cloud content files, the states including a set of primary states indicative of synchronization status provided by the framework for use across the multiple cloud storage services;
   determining, based on an application of determination logic, a synchronization state associated with a cloud content file for rendering in a user interface configured to display a file system representation of the cloud content file, wherein the application of the determination logic comprises:
   determining one or more file sync properties of the cloud content file,
   accessing a mapping data structure to lookup a state indicator icon to display that represents the synchronization state associated with the cloud content file, wherein the mapping data structure is a file that comprises data indicating: a listing of applicable synchronization states for the cloud content file, a plurality of state indicator icons that represent applicable synchronization states in the listing of applicable synchronization states, and applicable file sync properties usable for determining each application synchronization state of the applicable synchronization states in the listing of applicable synchronization states,
   determining the synchronization state associated with the cloud content file by evaluating, against the applicable synchronization states of the mapping data structure, the one or more file sync properties of the cloud content file to identify one or more applicable file sync properties for an applicable synchronization state of the listing of applicable synchronization states, and
   selecting, from the mapping data structure based on the determined applicable synchronization state, a state indicator icon for the cloud content file by correlating data associated with the determined applicable synchronization state with a respective state indicator icon of the plurality of state indicator icons; and
   exposing, through the user interface, the selected state indicator icon in the file system representation of the cloud content file.

2. The method as described in claim 1, wherein the determination logic is implemented by a component executing on the computing device.

3. The method as described in claim 1, wherein the mapping data structure defines the listing of applicable synchronization states for the cloud content file as an ordered list, and wherein the determination logic evaluates the ordered list in a deterministic manner until a matching state is found.

4. The method as described in claim 1, wherein the framework is configured to expose the state indicator icon across multiple different views of the file system representation available through one or more applications executing on the computing device.

5. The method as described in claim 1, wherein the framework is a component of an operating system of the computing device.

6. The method as described in claim 5, wherein the set of primary states is controlled by the operating system.

7. The method as described in claim 1, wherein the cloud content file comprises content synchronized over a network with the multiple cloud storage services to facilitate online access to the cloud content file across multiple devices.

8. The method as described in claim 1, wherein the determination logic determines at least two applicable synchronization states for the cloud content file, and wherein the exposing exposes at least two state indicator icons, corresponding with the at least two applicable synchronization states, through the user interface.

9. The method as described in claim 8, wherein the set of primary states include at least an available offline state, a pending state, and an error state and the at least two state indicator icons include a different icon used to visually represent each state.

10. The method as described in claim 1, wherein exposing comprises rendering the state indicator icon in association with items used to represent the cloud content files in the user interface.

11. The method as described in claim 1, further comprising associating metadata with the cloud content file to reflect the determined applicable synchronization state.

12. A method executed by at least one processor, comprising:
   determining, by the least one processor, one or more file sync properties of a cloud content file;
   accessing, by the least one processor, a mapping data structure to lookup a state indicator icon to display that represents a synchronization state associated with the cloud content file, wherein the mapping data structure is a file that comprises data indicating: a listing of applicable synchronization states for the cloud content file, a plurality of state indicator icons that represent applicable synchronization states in the listing of applicable synchronization states, and applicable file sync properties usable for determining each applicable synchronization state of the applicable synchronization states in the listing of applicable synchronization states;
   determining, by the least one processor, the synchronization state associated with the cloud content file by evaluating, against the applicable synchronization states of the mapping data structure, the one or more file sync properties of the cloud content file to identify one or more applicable file sync properties for an applicable synchronization state of the listing of applicable synchronization states;
   selecting, by the least one processor, from the mapping data structure based on the determined applicable synchronization state, a state indicator icon for the cloud content file by correlating data associated with the determined applicable synchronization state with a respective state indicator icon of the plurality of state indicator icons; and
   exposing, by the least one processor, through a user interface, the selected state indicator icon in a file system representation of the cloud content file.

13. The method of claim 12, wherein the at least one processor executes a determination logic component that performs processing operations to identify the state indicator icon for the cloud content file.

14. The method of claim 13, wherein the mapping data structure defines the listing of applicable synchronization states for the cloud content file as an ordered list, and wherein the determination logic evaluates the ordered list in a deterministic manner until a matching state is found for the cloud content file.

15. The method of claim 12, wherein the cloud content file comprises content synchronized over a network with the multiple cloud storage services to facilitate online access to the cloud content file across multiple devices.

16. The method of claim 12, wherein the correlating of the one or more file sync properties of the cloud content file with applicable file sync properties for the applicable synchronization state further comprises matching metadata associated with the one or more file sync properties of the cloud content file with stored metadata as the applicable file sync properties.

17. A system comprising:
   at least one processor; and
   a memory, operatively connected with the at least one processor, storing computer-executable instructions that, when executed by the at least one processor, causes the at least one processor to execute a method that comprises:
      determining one or more file sync properties of a cloud content file;
      accessing a mapping data structure to lookup a state indicator icon to display that represents a synchronization state associated with the cloud content file, wherein the mapping data structure is a file that comprises data indicating: a listing of applicable synchronization states for the cloud content file, a plurality of state indicator icons that represent applicable synchronization states in the listing of applicable synchronization states, and applicable file sync properties usable for determining each applicable synchronization state of the applicable synchronization states in the listing of applicable synchronization states;
      determining the synchronization state associated with the cloud content file by evaluating, against the applicable synchronization states of the mapping data structure, the one or more file sync properties of the cloud content file to identify one or more applicable file sync properties for an applicable synchronization state of the listing of applicable synchronization states;
      selecting, from the mapping data structure based on a determined applicable synchronization state, a state indicator icon for the cloud content file by correlating data associated with the determined applicable synchronization state with a respective state indicator icon of the plurality of state indicator icons; and
      exposing, through a user interface, the selected state indicator icon in a file system representation of the cloud content file.

18. The system of claim 17, wherein the at least one processor executes a determination logic component that performs processing operations to identify the state indicator icon for the cloud content file.

19. The system of claim 17, wherein the mapping data structure defines the listing of applicable synchronization states for the cloud content file as an ordered list, and wherein the determination logic evaluates the ordered list in a deterministic manner until a matching state is found for the cloud content file.

20. The system of claim 17, wherein the correlating of the one or more file sync properties of the cloud content file with applicable file sync properties for the applicable synchronization state further comprises matching metadata associated with the one or more file sync properties of the cloud content file with stored metadata as the applicable file sync properties.

* * * * *